H. T. KRAKAU.
DRAFT GEAR.
APPLICATION FILED SEPT. 26, 1908.
936,547.
Patented Oct. 12, 1909.
7 SHEETS—SHEET 5.
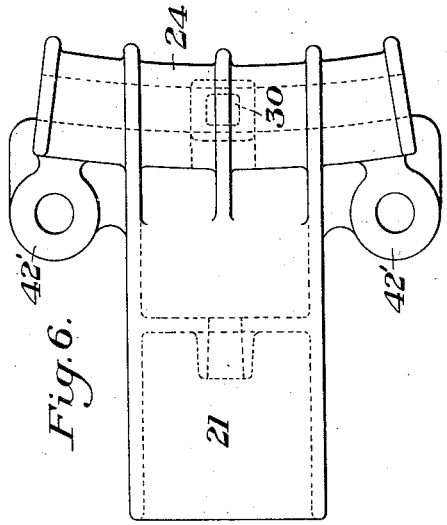
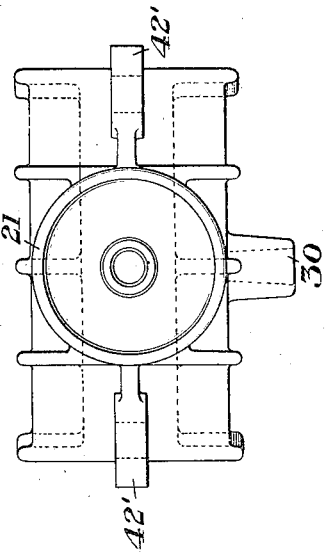
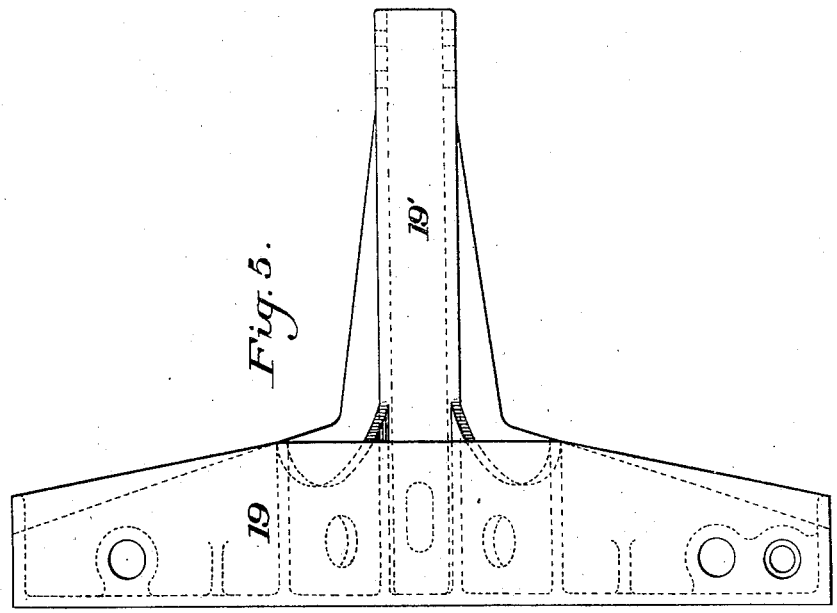
WITNESSES
INVENTOR
H. T. Krakau.

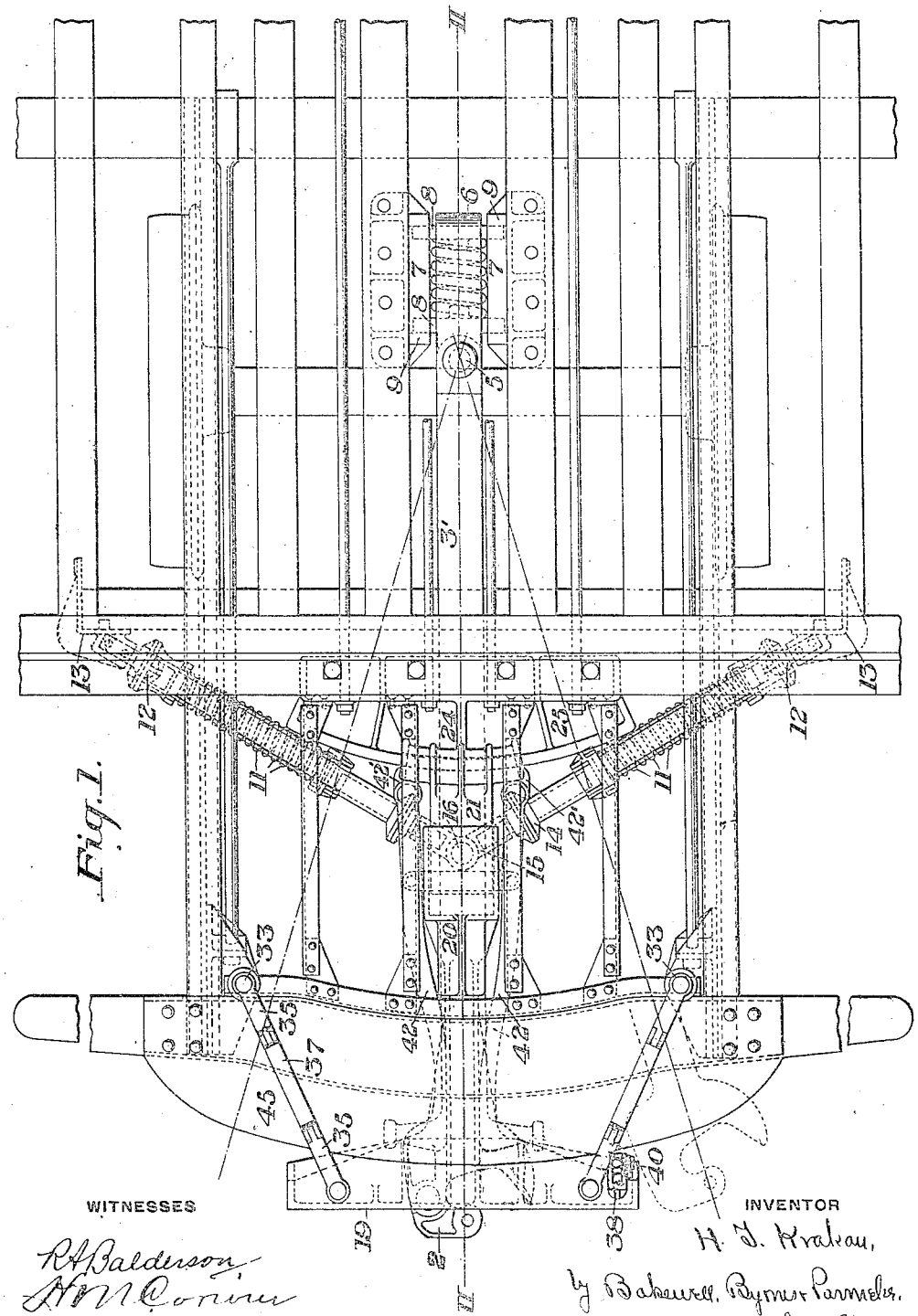

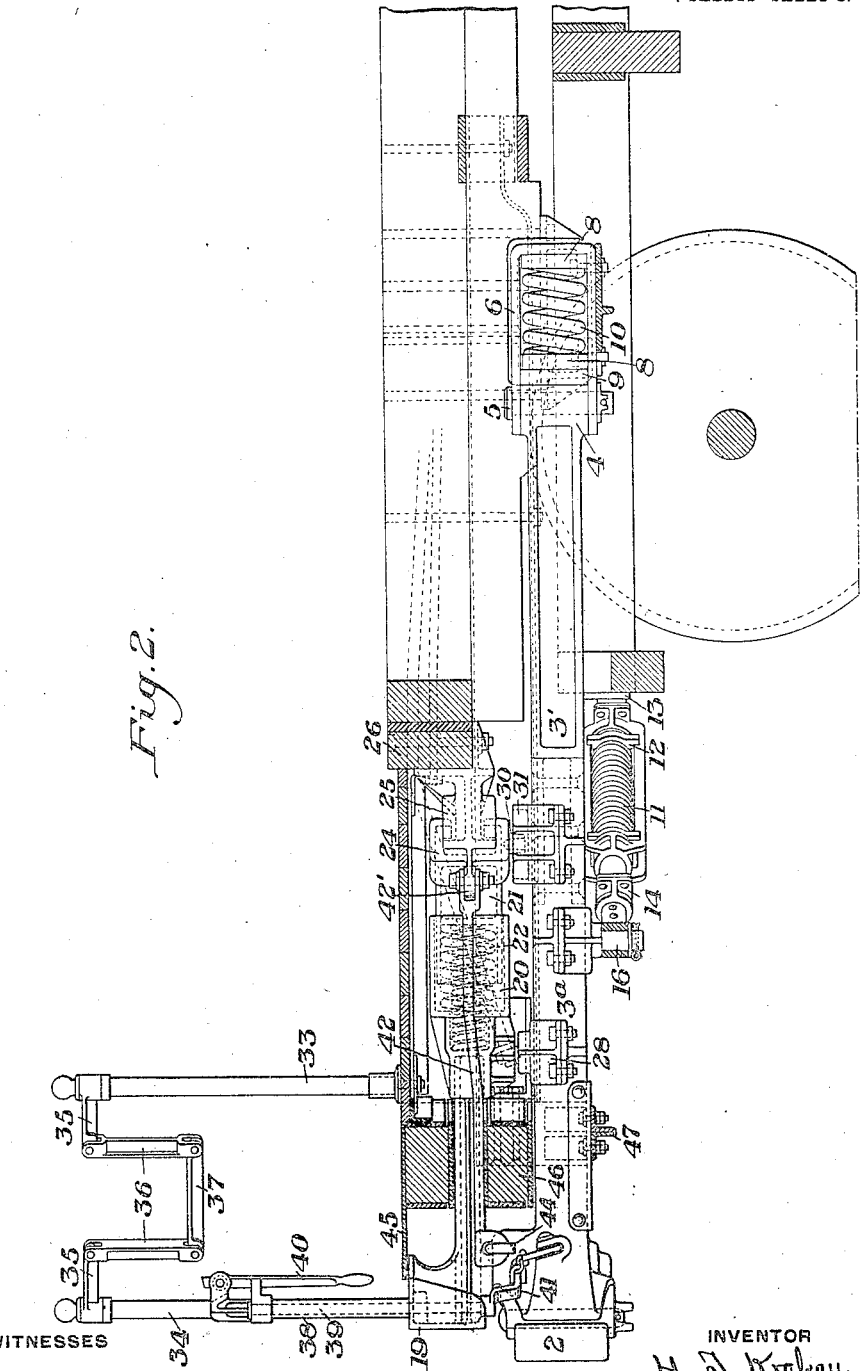

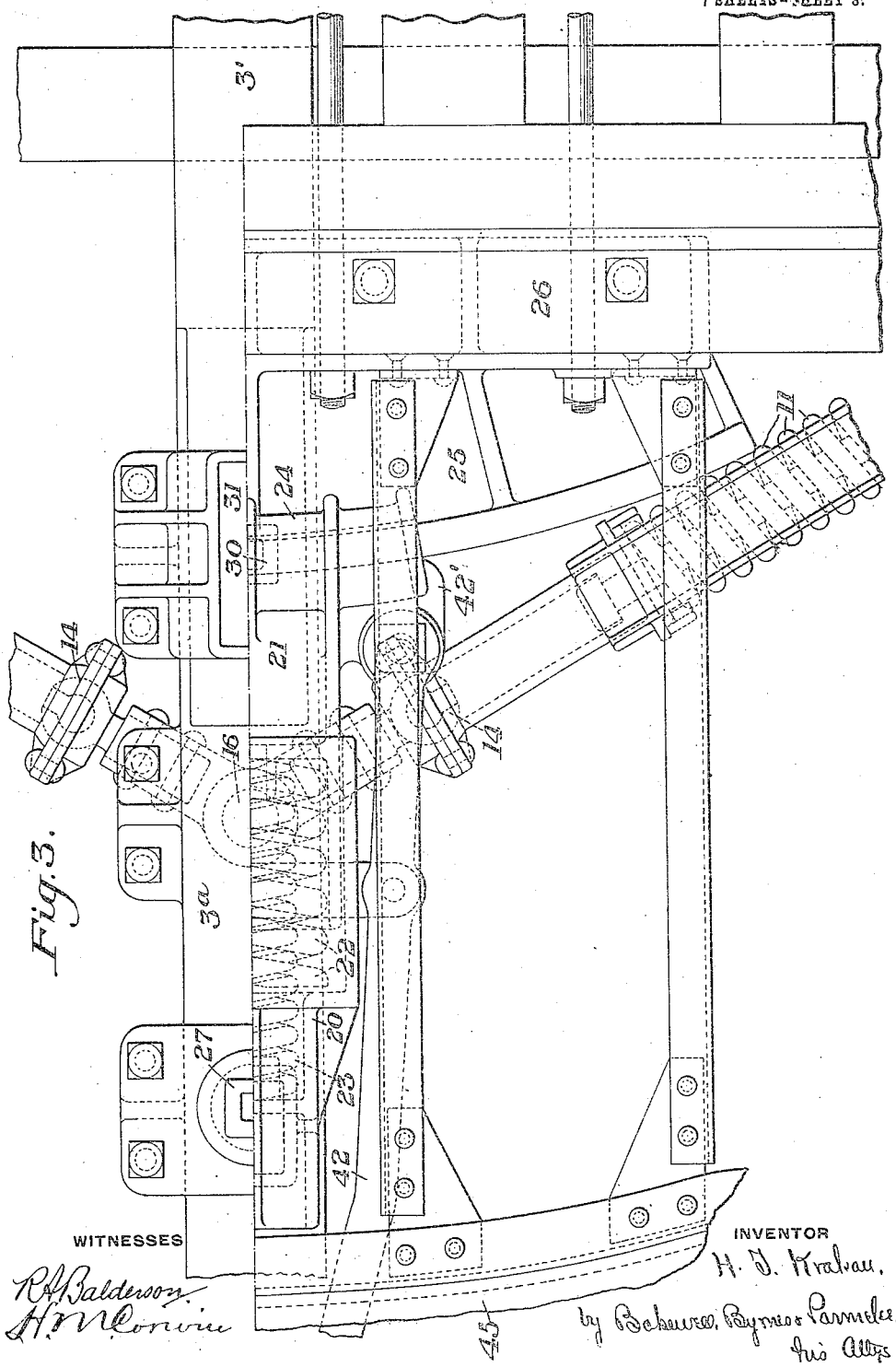

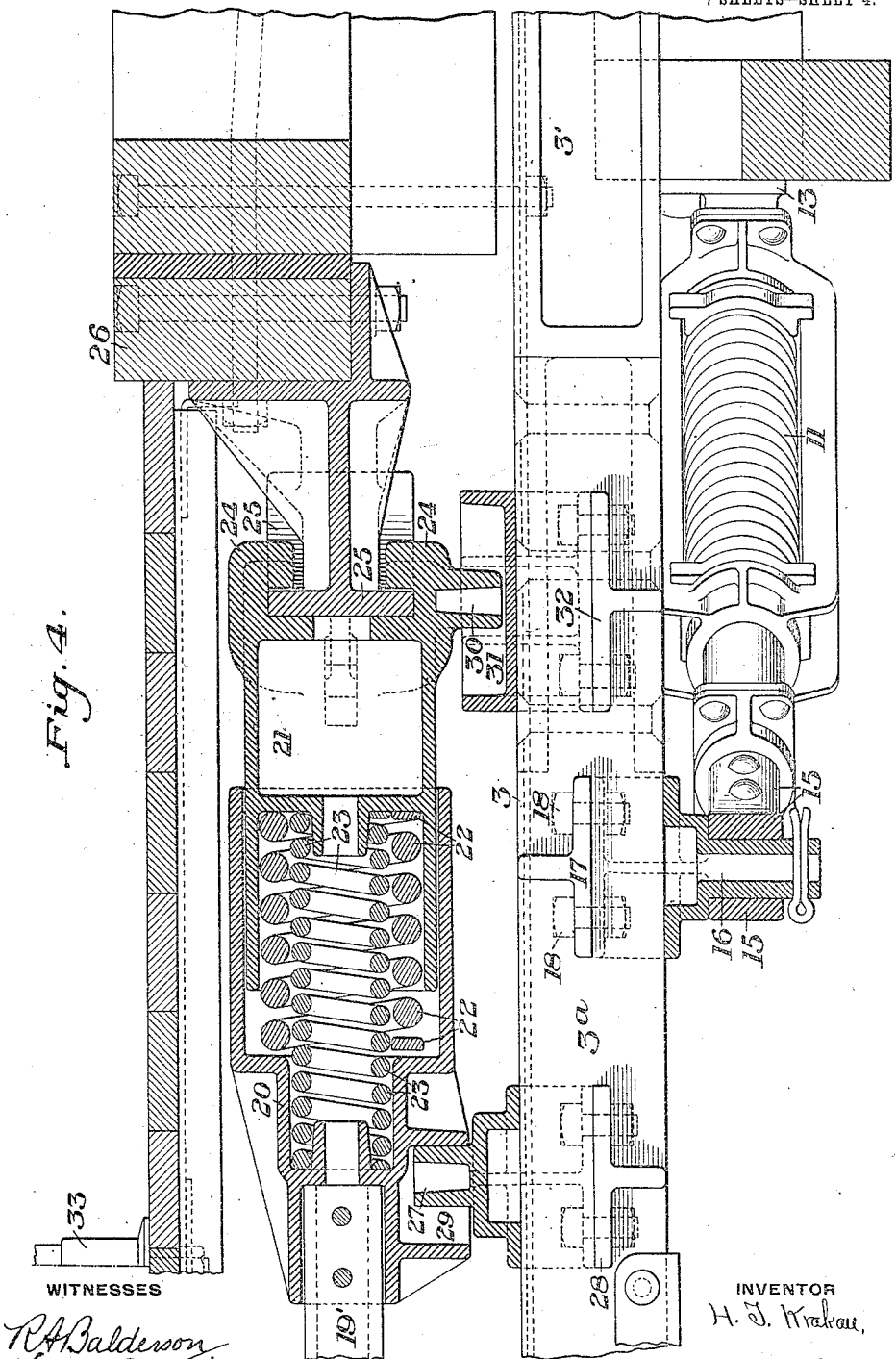

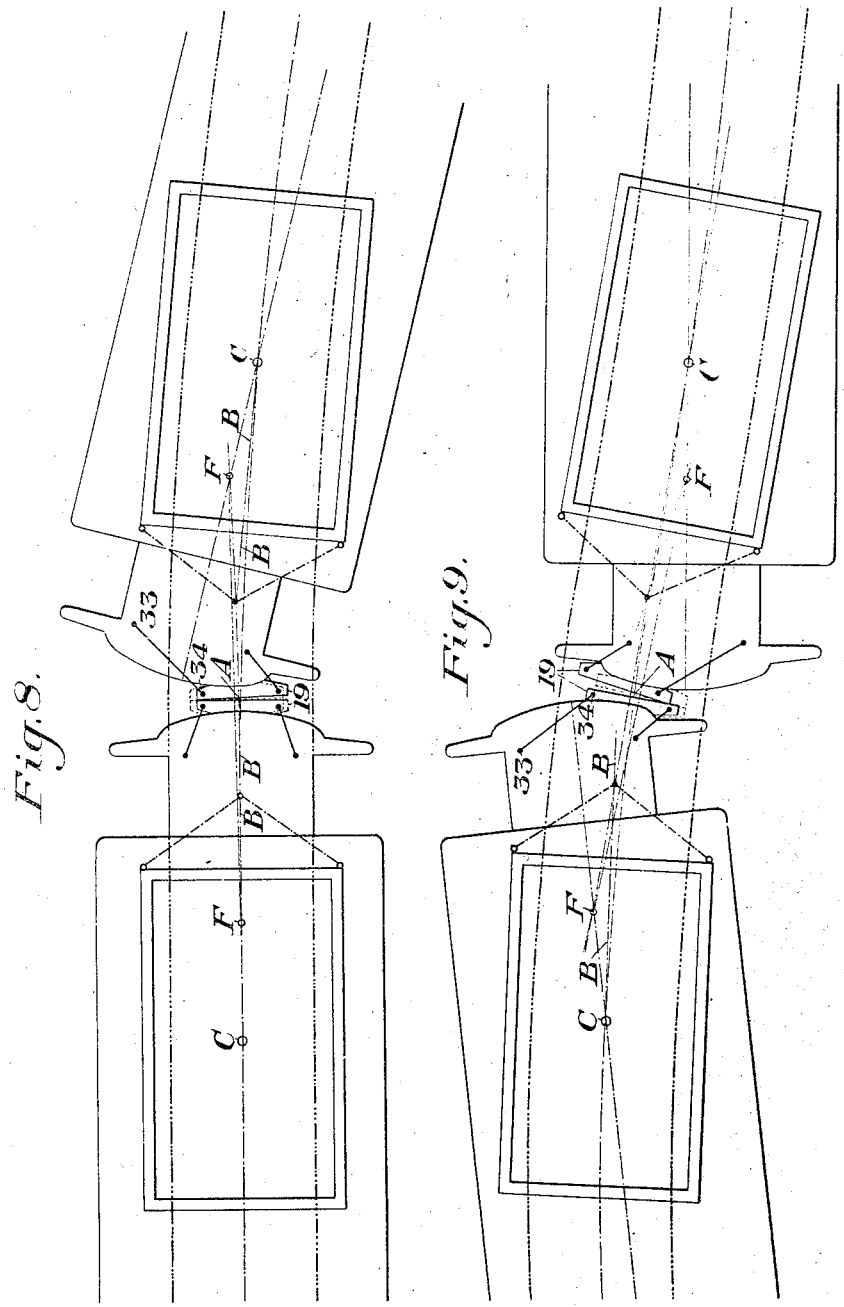

H. T. KRAKAU.
DRAFT GEAR.
APPLICATION FILED SEPT. 26, 1908.
936,547.
Patented Oct. 12, 1909.
7 SHEETS—SHEET 7.
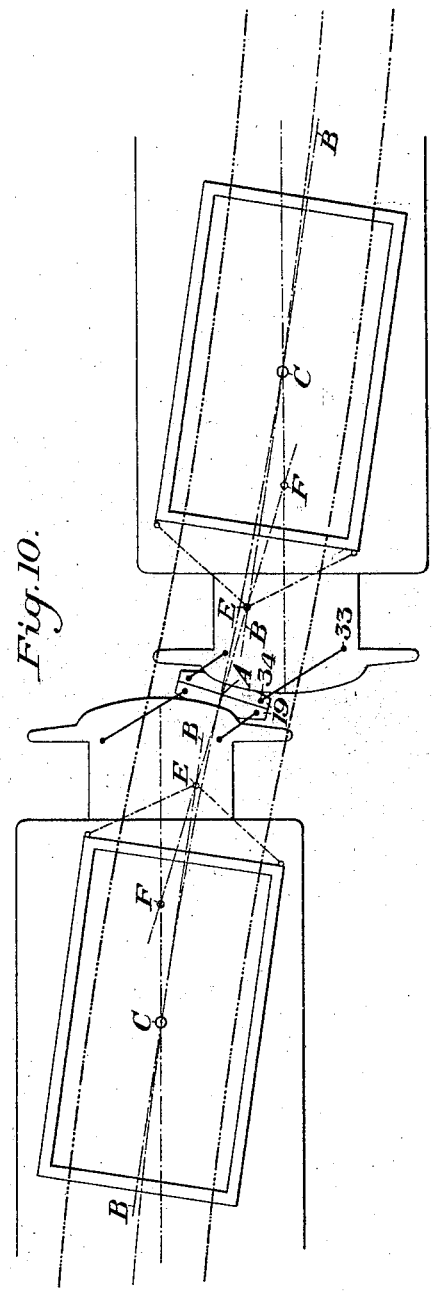
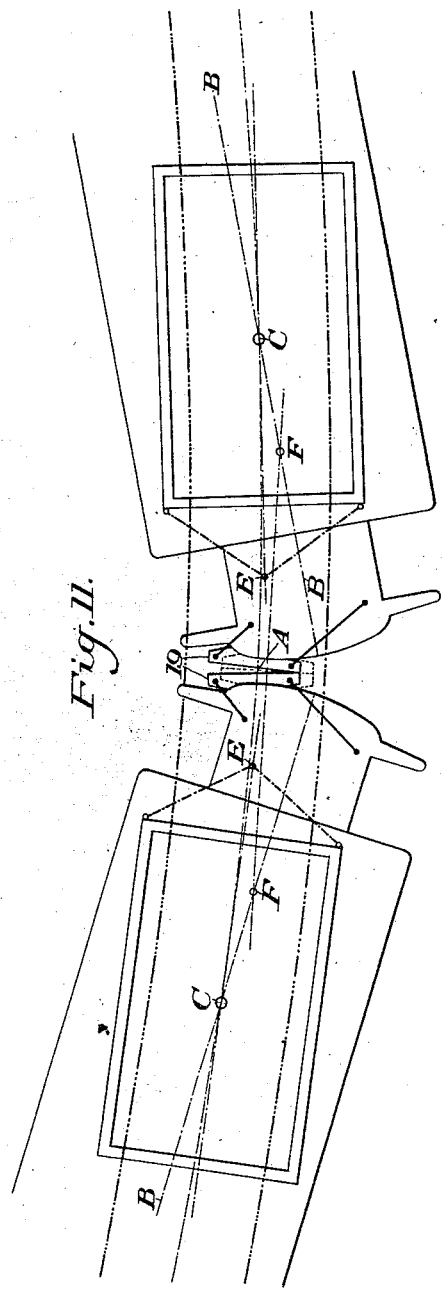

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-GEAR.

936,547.   Specification of Letters Patent.   Patented Oct. 12, 1909.

Original application filed March 24, 1908, Serial No. 422,889. Divided and this application filed September 26, 1908. Serial No. 454,888.

*To all whom it may concern:*

Be it known that I, HARRY T. KRAKAU, of Cleveland, in the county of Cuyahoga and State of Ohio, have invented a new and useful Draft-Gear, of which the following is a full, clear, and exact description, reference being had to the accompanying drawings, forming part of this specification, in which—

Figure 1 is a plan view of the draft gear; Fig. 2 is a vertical longitudinal section on the line II—II of Fig. 1; Fig. 3 is a plan view on a larger scale, showing the guiding connections between the swinging draft gear and the truck, and also showing the details of the platform buffer and its application to the car body; Fig. 4 is a vertical longitudinal section of parts shown in Fig. 2, but on a larger scale; Fig. 5 is a plan view of the face piece of the buffer; Fig. 6 is a plan view of the section which forms the guide and spring-holder for the rear end of the buffer; Fig. 7 is a front view of the parts shown in Fig. 6; Figs. 8, 9, 10 and 11 are diagram views illustrating the operation of my device when the cars as they meet are in various relative positions on curves, and showing the relative motions of the trucks, coupler and buffers, and the manner in which the buffers adjust themselves with their faces in contact throughout their breadth.

This application is a division of an application filed by me on March 24, 1908, Serial Number 422,889, patented September 29, 1908, Number 900,027.

My invention provides a draft gear in which the coupler is capable of swinging laterally through a wide range and is connected to the truck so as to be guided thereby positively into proper position.

The device can be used with success on passenger cars, and can also be applied to draft gears in a manner which will adapt them for use not only with passenger cars, but also with much greater efficiency than heretofore on freight car equipments. The advantages of such laterally swinging draft gears are that they relieve the cars from the great strain to which they are subjected when provided with laterally fixed draft gears, and also remove strain from the wheels, axles and track, and thus increase the durability of the cars and effect a very considerable economy in the power required to move the trains.

The drawings show the preferred embodiment of my invention, but it will be understood by those skilled in the art that the parts and their arrangement may be modified in many ways and that some of the parts of the apparatus may be applied to use without the others.

In the drawings, 2 represents the car coupler which has a long rear extension preferably made in the form of a shank 3, which terminates at the end in a socket 4, for a vertical pivot pin 5. For convenience, I prefer to make the coupler shank in two parts 3' and 3ª, the rear portion 3' being provided with the socket or pin hole 4, and being forked at its forward end so as to fit the sides of the forward portion 3ª. The socket 4 fits within a yoke 6 to which it is attached by the pivot pin 5, and the yoke is mounted between draft-irons 7, 7, followers 8 being set crosswise within the yoke and adapted to bear against stops 9 on the irons. A spring or springs 10 are interposed between the followers and with the followers constitutes the draft rigging. Any suitable kind of spring rigging may be employed.

When the car is in service, the coupler and its shank will turn radially on the axis of the pin 5, being guided by means described below, so that it will at all times be in approximately the central portion of the railway track. The yoke, however, does not turn, but remains in the longitudinal axis of the car, and as the coupler is subjected to the pressure of buffing and draft, the forward follower will be forced back against the spring or the rear follower drawn forward against the spring as the case may be, the forward stops 9 resisting the force of draft and the rear stops 9 resisting the force of buffing.

To guide the coupler shank and to hold it substantially at the center of the track, I provide it with guiding-rods shown in Figs. 3 and 4, which are made with telescopically arranged sections having interposed springs 11. At their rear ends these rods are connected by ball-and-socket joints 12, to brackets 13, at the ends of the truck, and at their forward ends the rods are connected by ball-and-socket joints 14 with an elbow lever or like connection 15, mounted at the middle on a vertical pin 16, which projects downwardly from the coupler shank and is preferably connected therewith by a pad 17 and bolts 18. The elbow lever connects the guiding rods to the coupler shank in such manner that tension exerted upon it on either side will turn it and keep its arm on the other side in the proper line, and the ball-and-socket joints afford flexibility to the parts.

The drawings show the application of my invention to passenger cars, and therefore, platform buffers are provided which are constructed in accordance with my invention, so that they will move laterally with the coupler shank and thus will be maintained in engagement with each other in all positions of the car. The platform buffer consists of three parts, a forward part or face piece 19, shown in detail in Fig. 5, with a straight face and a rearwardly projecting shank 19', secured to a front buffer spring case 20; the part 20 constitutes the second member of the platform buffer and is fitted telescopically over the rear buffer spring case 21, which constitutes the third member of the device. Springs 22, 23 are set in the spring cases, these springs being preferably two in number and the inner coil 23 longer than the outer coil and set in place under compression, so that, when the coupler is pulled out against its draft springs 10, as explained below, the inner coil will force the face of the buffer forward and will keep the opposing buffers in close contact, thus preventing an intervening gap.

The rear spring case 21, shown in detail in Figs. 4, 6 and 7, has a curved and flanged end portion 24, which fits upon a correspondingly curved segment 25, the front of which is preferably of T-shape in cross section, and the curvature such that its center will be substantially coincident with the pivotal axis of the coupler shank. Its body is secured to the end-sill 26 or other part of the car frame. The buffer face is so mounted as to be maintained at right angles to the shank of the coupler, this being accomplished preferably by making the buffer face rigid with respect to lateral motion in its connection with its shank and spring cases, so that it is substantially incapable of rocking or rotating on its shaft, and is thus held at right angles to the shank of the coupler.

The buffer is engaged with the coupler shank in such manner as to permit an independent relative longitudinal motion of these parts to a limited extent, and so as to cause them to move laterally together. This engagement is made by pins or projections on one of these parts, fitting within longitudinally slotted or elongated sockets on the other part, one pair of these engaging devices being at the rear of the buffer, and preferably as near to its guiding segment as possible, and the other being placed at a forward point, so that by applying lateral motion to the buffer at front and back points simultaneously, it is moved laterally with the coupler with as little friction and liability of binding as possible. The buffer being thus moved at its rear and forward points with the coupler, constitutes, in effect, a floating member which has its rear bearing on a curved and extended surface at the end sill of the car frame, and transmits the stresses of buffing to the end sill in a straight line in every position in which it may be carried by the coupler. The strains are thus distributed on the car frame in a most advantageous manner. The buffer by bearing at its rear end against the end sill of the car frame, instead of near the forward end of the buffer on the front of the platform, creates a minimum of friction on its bearing to be overcome in its lateral movement.

The engaging members of the buffer and coupler which I show in the drawing, consist of a forward pin 27, secured to a pad 28, on the coupler shank, and fitting within an inverted and elongated socket 29, on the section 20 of the buffer. This device serves also as a stop to prevent longitudinal removal of the buffer. The rear engaging member is constituted by a downwardly projecting pin 30 on the part 24, fitting within a socket 31, secured by a pad 32 to the coupler shank. This pin 30 is preferably placed directly under the segment 25, so as to insure the proper sliding motion of the buffer on the segment without danger of cramping, and the sockets 29 and 30 are preferably made only a little wider than the diameter of the pins, so that they will not allow independent lateral movement of the parts, but will permit independent longitudinal movement. The clearance for the forward pin 27 in its socket 29 is, however, preferably slight, so that if during buffing there is any tendency for the buffers to move sidewise and allow the couplers to buckle, such buckling tendency will be restrained by the action of the couplers locked together, because the engaging devices prevent the couplers from pulling away from their respective buffers. As long as the buffers are thus held in engagement they cannot move sidewise relatively to each other. The tendency to buckle is likewise prevented by the action of the buffers on each other. The buffer has a wide buffing face which is always held rigidly at right angles to the longitudinal axis of its own shank and to that of the coupler, because the buffer is not provided with ordinary springs, one on either side of the buffer, which allow one side to be compressed even though the other side may not be, but it is provided with a shank which is integral with the buffing face and which acts upon one central spring mechanism. For this reason, so long as two buffers are in contact and under buffing strain, their shanks can not get out of line with each other, and, as the cars are pushed over the varying curvature of the track, they will force each other laterally on their respective car bodies and thus maintain their shanks in the same line. As each buffer engages its coupler, and one is thus prevented from moving laterally without, or forced to move laterally with the other, the couplers will be held in line also and prevented from buckling. This action of the buffers on each other assists the truck connections in moving the couplers laterally when the curvature of the track changes. During buffing strains, when there may be more or less friction between the rear end of the buffer and its bearing on the car frame it is important that the increased resistance to lateral movement thus produced should not increase the work to be done by the truck connections, but be overcome by the action of the buffers themselves.

In Figs. 8 to 11, I illustrate the mode by which the car coupler is guided to substantially the center of the track under all ordinary conditions. This is done by proper correlation of the point F, where the draft gear is pivoted to the car body, the point E at which the guiding rods are connected to the draft gear, and the length of the draft gear itself; that is to say, the distance between the pivotal point and the coupler point (a term which may be used to define the point A, where the longitudinal center line of the coupler intersects the inner face of the outer arm of its knuckle, or the point of pulling contact between two interlocked knuckles). To determine these points, I fix the pivotal point 5 arbitrarily at a short distance in advance of the bolster. Then having located the coupling point A at a point at the center of the track when the car is on a curve, I locate the point E as approximately the point where a straight line between the points F and A intersects the line B—B, which is the line perpendicular to the truck at its center. The point at which these two lines will intersect is dependent upon the length of the draft gear. I may also determine these points by locating first the point E and then locating the point F (the pivotal point of the draft gear) at the point where the line between A and E intersects the line C—D which is the center line of the car frame; or I may locate the points F and E first and then, drawing a straight line therethrough, locate the point A where that line intersects the center line of the curved track. This will determine the necessary length of draft gear when the points F and E are first located.

Owing to the extent to which the car coupler projects beyond the center of the truck, the coupler will not necessarily be directed to the center of the track at the moment when the wheels of the truck reach the beginning of the curve; and inaccuracy of guiding to a slight extent is also apt to occur by reason of the gage or clearance between the flanges of the wheels and the rails of the track. Notwithstanding these factors of inaccuracy, however, the coupler in my device is guided substantially to the center of the track under all conditions, by reason of the action of the buffers 19. When two opposing cars meet each other, the faces of the opposing buffers will ordinarily be parallel, but under the conditions described above, as shown in Figs. 8, 9 and 11 when the couplers are not guided exactly to the center of the track, the buffing faces will be slightly inclined to each other, and when they engage, they will adjust themselves by forcing the buffers laterally until their faces make contact throughout their breadth, and will thus force the couplers into exact alinement and into normal position at the center of the track, and will hold them in that position.

As the buffers have considerable lateral motion during the passage of the cars around curves, it is desirable to provide flexible hand-rails between which the passengers can walk from one car to the next. I prefer to use the means invented by me and shown in Figs. 2, 8 and 11. I employ upright posts 33, 34, the rear post being fixed to the car body and the forward post being fixed to the buffer section 19. These posts are connected by jointed rail sections 35, 36 and 37, the horizontal sections 35 being swiveled on the upper ends of the posts, the vertical sections 36 being pivoted to the ends of the sections 35 and depending therefrom, and the section 37 connecting the ends of the sections 36. The necessary lateral motion of these jointed rails is afforded by the swiveling of the horizontal sections 35, and the elongation of the rails is provided for by the jointed sections 36 and 37, but they are laterally inflexible. The manner of operation when in use is shown in diagram in Figs. 8 and 11.

For the purpose of operating the lock of the coupler, I employ a hollow post 38, which is mounted on the buffer section 19, and has a vertical shaft 39, extending through it. This shaft has, at its upper end, an operating lever 40, and at its lower end a crank 41, for attachment to the coupler lock mechanism so that as the shaft moves with the coupler and buffer in their lateral travel, it will always be in proper position for successful operation.

My invention also affords means for the use of safety chains and rods, by which the cars are connected so that in the event of breaking of the couplers the cars will not part. For this purpose, I employ rods 42, connected at their rear ends to lugs 42' on the section 21 of the buffer and thence extending forwardly and terminating just back of the face of the buffer, the safety-chains 44 being attached to the ends of the rods. This affords an attachment for the safety chains which the lateral movement of the ends of the car bodies will not disturb.

It will be noticed that the platform of the car is provided with a projecting fixed cover-plate 45, which serves as an apron to cover the gap between the top of the buffer and the platform on which the passengers step as they pass from one car to the next. This plate in my device is made sufficiently wide to afford a cover for the buffer in its most extreme lateral positions, and is preferably curved substantially concentrically with the pivotal point of the coupler. My buffer is relatively narrow, and the passengers can step over the center of the buffer, no matter how much it is swung to one side.

The buffer is provided with a carry-iron 46, and the coupler with an independent carry-iron 47.

I claim:

1. The combination of a radially movable coupler, guiding connections with the truck whereby the coupler is automatically guided substantially to the center of the track into position for coupling with another car, and means associated with the coupler to engage a corresponding means associated with the coupler of another car to automatically hold the couplers in alinement after they are coupled and reinforcing the action of the guiding connections, substantially as described.

2. The combination of a radially movable coupler, guiding connections with the truck whereby the coupler is automatically guided substantially to the center of the track into position for coupling with another car, and a buffer engaged by the coupler and adapted to engage the buffer of another car to automatically hold the couplers in alinement after they are coupled and to reinforce the action of the guiding connections.

In testimony whereof, I have hereunto set my hand.

HARRY T. KRAKAU.

Witnesses:
THOMAS W. BAKEWELL,
ANNA E. WALLACE.